Dec. 6, 1927.
F. E. DAYES
1,651,753
BATTERY CLAMP AND SUPPORT
Filed July 10, 1924
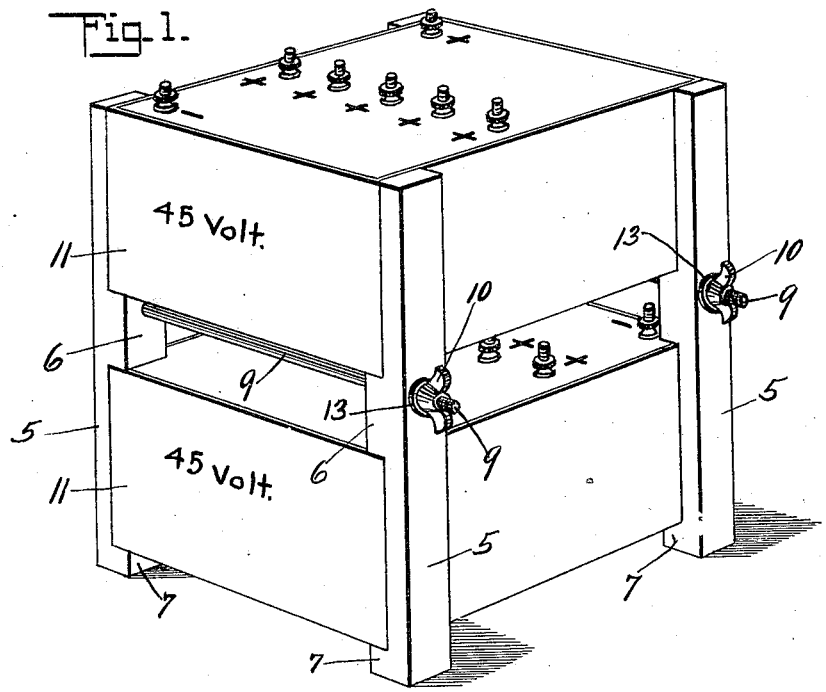
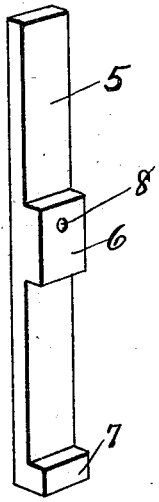
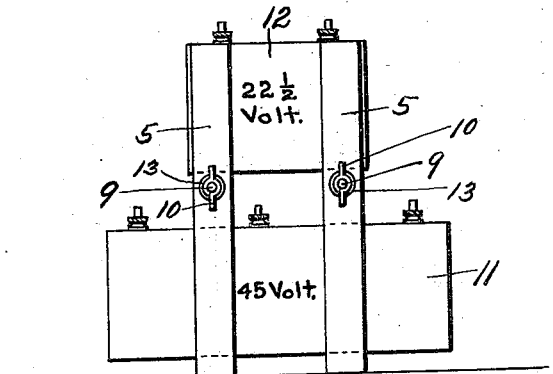
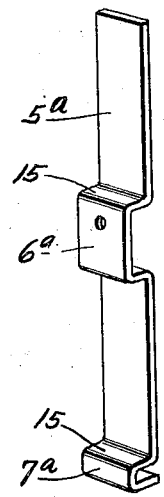
INVENTOR
Frederick E. Dayes
BY F. H. Gibbs
ATTORNEY Patented Dec. 6, 1927.

1,651,753

UNITED STATES PATENT OFFICE.

FREDERICK E. DAYES, OF BROOKLYN, NEW YORK.

BATTERY CLAMP AND SUPPORT.

Application filed July 10, 1924. Serial No. 725,222.

In the drawings:

Figure 1 is a perspective view illustrating the invention applied to a pair of 45-volt batteries commonly called B batteries.

Figure 2 is a view of one of the standards hereinafter referred to when formed of fibrous or other non-metallic substance.

Figure 3 is similar view of a modified form of standard adapted to be formed from non-corrosive metal; and Figure 4 is a side elevational view illustrating the device when employed as a clamp support and spacer for a plurality of batteries, one of which is a 45-volt battery and the other of which is a 22½-volt battery of lesser size.

The object of the invention is to provide a simple, convenient and economical means adapted to be employed for the purpose of supporting batteries above a stand or table in vertically stacked relation one to the other with each succeeding battery elevated a sufficient distance from the lowermost battery to provide a clear space affording access to the battery terminals, and while the invention is shown as supporting two 45-volt batteries in Figure 1 and a 45-volt and a 22½-volt battery in Figure 4, it is obvious that the standards hereinafter referred to may be of any predetermined length and provided with any number of supporting and spacing shoulders and be thus made available to support a greater number of batteries in spaced relation.

Referring to the parts, 5 indicates one of the standards which, as shown in Figure 2, is formed of wood, molded fibre or any other suitable acid-resisting material. The standards 5 are provided with shouldered protuberances or projections 6 and 7 which may be integral with the standards as indicated in Figure 2 or may be separately formed and attached thereto. The projections 6 lie between adjacent batteries in the stack and afford upper and lower shoulders for sustaining the upper battery and spacing the lower one from it. The shoulders of the projections 7 sustain the lower battery. The projections 6 are perforated at 8 for the passage therethrough of the tie-rods 9 which latter are equipped with winged nuts 10 or their equivalent so that when the batteries 11—11 or 11 and 12 are to be supported, the winged nuts may be set up as against the washers 13 to cause the standards 5 to press against the sides of the batteries and at the same time hold the spacing shoulders 6 in proper position between the lower and the upper battery so as to properly support them and space the upper battery from the lower one. The upper and lower batteries co-operate in sustaining the pull of the tension members or ties 9 on the corresponding pairs of opposed standards 5, 5 to clamp them together on the batteries: i. e., if there were only a single battery, unresisted pull of the ties adjacent it would tend and be able to rock the standards together when the winged nuts 10 were tightened. Such co-operation follows from the location of the tie apertures 8 of the standards 5 between the adjacent battery sustaining shoulders of the standards 5, afforded by the projections 6 and 7.

It has been found that the type of B batteries used in radio are inclined to sweat more or less, and on that account the lower shoulders 7 are provided to support the lowermost battery at some distance above the table or other article upon which the batteries are placed, and it is obvious that when the winged nuts are properly positioned, these shoulders 7 will be held in proper position below the lowermost battery to support it at some little distance above the table.

In the commercial product now available, the 45-volt batteries and 22½-volt batteries are of the same length, hence it is obvious that the clamping standards 5 may be applied as shown in Figure 4 to support, clamp and space a 45-volt battery and a 22½-volt battery, or any multiples thereof, provided the standards are properly extended.

It is advisable to space the batteries vertically so as to afford access to the battery terminals marked + and − in the figures.

In lieu of the fibrous standards hereinbefore referred to, the modification of Figure 3 may be employed, in which the standard $5^a$ is made of non-corrosive metal with the shoulder $6^a$ and the shoulder $7^a$ pressed therein as indicated so as to form seats 15 upon which the batteries may rest. It is obvious that the standards $5^a$ may be substituted for the standards 5 and connected by means of the tie-rods, etc., as hereinbefore indicated.

What I claim is:

1. The combination with batteries in stack, of supporting means therefor comprising opposed standards with shoulders for sustaining the batteries, and tie rods between adjacent batteries of the stack for holding the opposed standards clamped together on them, so that such adjacent batteries co-operate in sustaining the pull and rocking tendency of the ties on the standards.

2. A standard for supporting batteries in stack, as set forth in claim 1, having shoulders for sustaining the batteries, and tie apertures between adjacent battery-sustaining shoulders.

3. A standard for supporting batteries in stack, as set forth in claim 1, having a plurality of lateral protuberances intermediate their ends for sustaining and spacing batteries, and tie apertures therein at each of said protuberances.

In witness whereof I have hereunto set my hand.

FREDERICK E. DAYES.